(12) United States Patent
Kim

(10) Patent No.: US 12,267,547 B2
(45) Date of Patent: Apr. 1, 2025

(54) INPUT DEVICE

(71) Applicant: KYUNG IN ELECTRONICS CO., LTD, Seoul (KR)

(72) Inventor: Bum Seok Kim, Anyang-si (KR)

(73) Assignee: KYUNG IN ELECTRONICS CO., LTD, Seoul (KR)

( * ) Notice: Subject to any disclaimer, the term of this patent is extended or adjusted under 35 U.S.C. 154(b) by 24 days.

(21) Appl. No.: 18/255,577

(22) PCT Filed: Nov. 3, 2021

(86) PCT No.: PCT/KR2021/095089
§ 371 (c)(1),
(2) Date: Jun. 1, 2023

(87) PCT Pub. No.: WO2022/186463
PCT Pub. Date: Sep. 9, 2022

(65) Prior Publication Data
US 2023/0421834 A1 Dec. 28, 2023

(30) Foreign Application Priority Data
Mar. 3, 2021 (KR) .................. 10-2021-0028002

(51) Int. Cl.
*H04N 21/422* (2011.01)
*G06F 3/0362* (2013.01)

(52) U.S. Cl.
CPC ..... *H04N 21/42216* (2013.01); *G06F 3/0362* (2013.01); *H04N 21/42224* (2013.01)

(58) Field of Classification Search
CPC ........ H04N 21/42216; H04N 21/42224; G06F 3/038; G06F 3/041; G06F 3/044; G06F 3/0488; G06F 3/0362; G06F 3/0354
See application file for complete search history.

(56) References Cited

U.S. PATENT DOCUMENTS 8,438,503 B2 * 5/2013 Hatambeiki ........ G06F 3/04883
340/870.2
9,001,040 B2 * 4/2015 Dean .................. G06F 3/03543
345/161
(Continued)

FOREIGN PATENT DOCUMENTS

JP         2020-87174 A    6/2020
KR  10-2014-0138627 A    12/2014
(Continued)

OTHER PUBLICATIONS

International Search Report for PCT/KR2021/095089 by Korean Intellectual Property Office dated Feb. 11, 2022.
(Continued)

*Primary Examiner* — Vinh T Lam
(74) *Attorney, Agent, or Firm* — BROADVIEW IP LAW, PC

(57) ABSTRACT

Provided is an input device which allows a user to select desired contents more quickly and intuitively in selection of contents. The input device includes: a navigation key manipulated to select one direction among a plurality of directions; a touch unit which is manipulated by a user to input rotation while the user touches the touch unit with a portion of the body; and a control unit which controls movement on a user interface screen of a target device based on one or more direction inputs corresponding to the navigation key and a rotation input on the touch unit, wherein the navigation key and the touch unit are coupled with each other in a stacked structure.

16 Claims, 12 Drawing Sheets

(56) References Cited

U.S. PATENT DOCUMENTS

| | | | |
|---|---|---|---|
| 9,086,739 B2 * | 7/2015 | Hatambeiki | G06F 3/0487 |
| 9,134,815 B2 * | 9/2015 | Hatambeiki | G06F 3/04883 |
| 9,250,715 B2 * | 2/2016 | Hatambeiki | H04N 21/47 |
| 9,261,976 B2 * | 2/2016 | Hatambeiki | H04N 21/42222 |
| 9,323,453 B2 * | 4/2016 | Hatambeiki | G06F 3/04847 |
| 9,335,923 B2 * | 5/2016 | Hatambeiki | G06F 3/017 |
| 9,477,402 B2 * | 10/2016 | Hatambeiki | H04N 21/42224 |
| 9,594,498 B2 * | 3/2017 | Dean | G06F 3/0304 |
| 9,811,200 B2 * | 11/2017 | Lee | B60K 35/00 |
| 10,126,897 B2 * | 11/2018 | Kwon | G06F 3/03547 |
| 10,146,386 B2 * | 12/2018 | Kwon | B60K 35/10 |
| 10,275,076 B2 * | 4/2019 | Hoggarth | G06F 3/042 |
| 10,514,784 B2 * | 12/2019 | Choi | B60K 35/10 |
| 10,551,958 B2 * | 2/2020 | Shin | B60K 35/50 |
| 10,678,425 B2 * | 6/2020 | Min | B60K 35/22 |
| 10,785,441 B2 * | 9/2020 | Candelore | G06F 3/038 |
| 11,317,136 B2 * | 4/2022 | Liu | H01H 9/0235 |
| 11,474,687 B2 * | 10/2022 | Min | B60K 35/22 |
| 11,503,360 B2 * | 11/2022 | Epstein | H04N 21/41265 |
| 2004/0253931 A1 * | 12/2004 | Bonnelykke | G06F 3/033 |
| | | | 455/90.3 |
| 2006/0028454 A1 * | 2/2006 | Branton | G06F 3/03547 |
| | | | 345/173 |
| 2006/0250377 A1 * | 11/2006 | Zadesky | G06F 1/169 |
| | | | 345/173 |
| 2007/0152983 A1 * | 7/2007 | McKillop | G06F 3/04886 |
| | | | 345/173 |
| 2007/0188459 A1 * | 8/2007 | Bells | G06F 3/03549 |
| | | | 345/167 |
| 2007/0188460 A1 * | 8/2007 | Bells | G06F 3/03549 |
| | | | 345/167 |
| 2007/0188461 A1 * | 8/2007 | Bells | G06F 3/038 |
| | | | 345/167 |
| 2008/0204430 A1 * | 8/2008 | Cheon | G06F 3/03549 |
| | | | 345/184 |
| 2008/0242377 A1 * | 10/2008 | Lee | H04M 1/0277 |
| | | | 455/575.1 |
| 2009/0061928 A1 * | 3/2009 | Lee | G06F 3/0362 |
| | | | 455/556.1 |
| 2015/0049059 A1 * | 2/2015 | Zadesky | H04M 1/0202 |
| | | | 345/173 |
| 2015/0062050 A1 * | 3/2015 | Zadesky | G06F 3/042 |
| | | | 345/173 |
| 2015/0160856 A1 * | 6/2015 | Jang | G06F 3/04886 |
| | | | 715/773 |
| 2016/0004355 A1 * | 1/2016 | Zadesky | G06F 1/1626 |
| 2016/0137064 A1 * | 5/2016 | Min | B60K 35/10 |
| | | | 345/156 |
| 2016/0209871 A1 | 7/2016 | Dabov et al. | |
| 2016/0261903 A1 * | 9/2016 | Epstein | H04N 21/42221 |
| 2016/0378200 A1 * | 12/2016 | Lee | G06F 3/04883 |
| | | | 345/158 |
| 2017/0024117 A1 * | 1/2017 | Hong | G06F 40/166 |
| 2017/0038891 A1 * | 2/2017 | Lee | B60T 7/085 |
| 2017/0257593 A1 | 9/2017 | Candelore et al. | |
| 2018/0081452 A1 * | 3/2018 | Min | G06F 3/03547 |
| 2019/0034007 A1 * | 1/2019 | Zadesky | G06F 1/1613 |
| 2019/0171313 A1 * | 6/2019 | Zadesky | H04M 1/0202 |
| 2019/0196622 A1 * | 6/2019 | Zadesky | G06F 3/04842 |
| 2021/0116961 A1 * | 4/2021 | Zadesky | G06F 3/0338 |

FOREIGN PATENT DOCUMENTS

| | | |
|---|---|---|
| KR | 10-2016-0085189 A | 7/2016 |
| KR | 10-2017-0074537 A | 6/2017 |
| KR | 10-1960737 B1 | 3/2019 |

OTHER PUBLICATIONS

Office Action for KR 10-2021-0028002 by Korean Intellectual Property Office dated Feb. 17, 2024.

* cited by examiner

INPUT DEVICE

CROSS-REFERENCE TO RELATED APPLICATIONS

This application is a National Phase Entry Application of PCT Application No. PCT/KR2021/095089, filed on Nov. 3, 2021, which claims priority to Korean Patent Application No. 10-2021-0028002, filed on Mar. 3, 2021, in Korean Intellectual Property Office, the entire contents of which are hereby incorporated by reference in its entirety.

TECHNICAL FIELD

The present invention relates to an input device, and more specifically, to an input device such as a remote controller adopted to an A/V device such as a TV set.

BACKGROUND ART

As the number of contents provided by various broadcasting and media platforms continues to increase, there is a trend towards presenting diverse contents on a single screen interface (e.g., Netflix content screen, YouTube content screen, and the like) to facilitate user content selection.

For instance, as illustrated in FIG. 1 or 2, an input device (e.g., a remote controller 20 or 30) uses a specific communication method (e.g., an IR communication method, or an RF wireless communication method such as Bluetooth, Zigbee, or the like) to control an A/V device 10, such as a TV set or the like, directly and remotely or to control the A/V device 10 through a set-top box (not shown) connected to the A/V device 10 remotely.

FIG. 1 is a diagram illustrating an example of a conventional media content selection control method, depicting a case in which a user wants to find desired media contents on a user interface screen 12 of a conventional A/V device 10. Conventionally, when a user selects desired media contents on the user interface screen 12, the user had to manually click on a left key 22c, a right key 22d, an up key 22a, and a down key 22b with the user's finger to find the desired media content.

FIG. 2 is a diagram illustrating an example of a conventional video media frame selection control method, depicting a case in which a user wants to find a desired video frame while watching video media. Conventionally, in a case in which a user wants to find a desired video frame while watching video media, the user had to manually click on a rewind key 32a or a fast-forward key 32b with the user's finger one by one to search for the desired video frame.

As described above, the conventional input devices (e.g., remote controllers) used for controlling media contents employ navigation key (e.g., a left key 22c, a right key 22d, an up key 22a, a down key 22b, a rewind key 32a, fast-forward key 32b, etc.) for selection.

However, as mentioned above, in the conventional method, users had to press each navigation key one by one to search for and select desired contents, so it takes too much time to find desired contents or it is inconvenient. For example, even if the user operates the left key 22c or right key 22d as quickly as possible, it is difficult to achieve a speed of approximately 108 milliseconds (presses nine times per second) or higher when using IR communication.

DISCLOSURE

Technical Problem

Accordingly, the present invention has been made in view of the above-mentioned problems occurring in the related art, and it is an object of the present invention to provide an input device which allows a user to select desired contents more quickly and intuitively in selection of contents.

Technical Solution

To accomplish the above-mentioned objects, according to the present invention, there is provided an input device including: a navigation key manipulated to select one direction among a plurality of directions; a touch unit which is manipulated by a user to input rotation while the user touches the touch unit with a portion of the body; and a control unit which controls movement on a user interface screen of a target device based on one or more direction inputs corresponding to the navigation key and a rotation input on the touch unit, wherein the navigation key and the touch unit are coupled with each other in a stacked structure.

The control unit controls selection movement between media contents aligned in rows or columns on the user interface screen based on at least one among one or more direction inputs corresponding to the navigation key and the rotation input on the touch unit.

The control unit transmits remote control signals to the target device in an input cycle corresponding to the rotational speed on the touch unit, and scrolls media contents aligned in rows or columns on the user interface screen at a speed corresponding to the input cycle with respect to the rotational direction on the touch unit.

The control unit transmits remote control signals to the target device in an input cycle corresponding to the rotational speed on the touch unit, and moves a playback position of a video frame at a speed corresponding to the input cycle with respect to the rotational direction on the touch unit.

The control unit further controls the row movement or the column movement of the media contents in the matrix structure on the user interface screen based solely on the direction selected by the navigation key, independently from the rotation input of the touch unit.

The touch unit includes: a touch PCB assembly which includes a plurality of channels patterned thereon to detect touch and rotation of a portion of the user's body; and a touch member stacked on the upper portion of the touch PCB assembly.

The touch PCB assembly generates a change difference in capacitance value for each channel, processes the change difference into absolute coordinates using the change difference in capacitance value for each channel, and transmits the absolute coordinates as electrical signals to the control unit, when the user rotates (moves) the finger in a clockwise or counterclockwise direction while touching the surface of the touch member.

The touch PCB assembly includes: a channel unit on which the plurality of channels for rotation detection are patterned; and a cable of which one side is connected to the channel unit and the other side is connected to the control unit.

A first adhesive member which is adhered on the upper portion of the channel unit is additionally installed between the channel unit and the touch member.

The navigation key is stacked beneath the channel unit, and
wherein a second adhesive member which is adhered on the lower portion of the channel unit is additionally installed between the channel unit and the navigation key.

The touch PCB assembly is stored in a storage space of the cover body by the medium of the navigation key, and the touch member is stored in the storage space on the upper portion of the touch PCB assembly.

Holes are respectively formed in centers of the cover body, the touch PCB assembly, the navigation key, and the touch member, a key pad having a protrusion at the center is installed on the lower portion of the cover body, and an OK key is coupled to the protrusion to pass through and to be exposed through the holes of the cover body, the touch PCB assembly, the navigation key, and the touch member.

In another aspect of the present invention, provided is an input device including: a navigation key manipulated to select one direction among a plurality of directions; and a touch unit which is manipulated by a user to input rotation while the user touches the touch unit with a portion of the body, wherein the touch unit includes: a touch PCB assembly which includes a plurality of channels patterned thereon to detect touch and rotation of a portion of the user's body; and a touch member stacked on the upper portion of the touch PCB assembly.

Advantageous Effects

The output device according to the configuration of the present invention allows a user to select media contents more rapidly than with the conventional device.

The output device allows the user to control the rewinding (REW) and fast-forwarding (FF) functions quickly and intuitively while watching video media.

MODE FOR INVENTION

Figure 1:
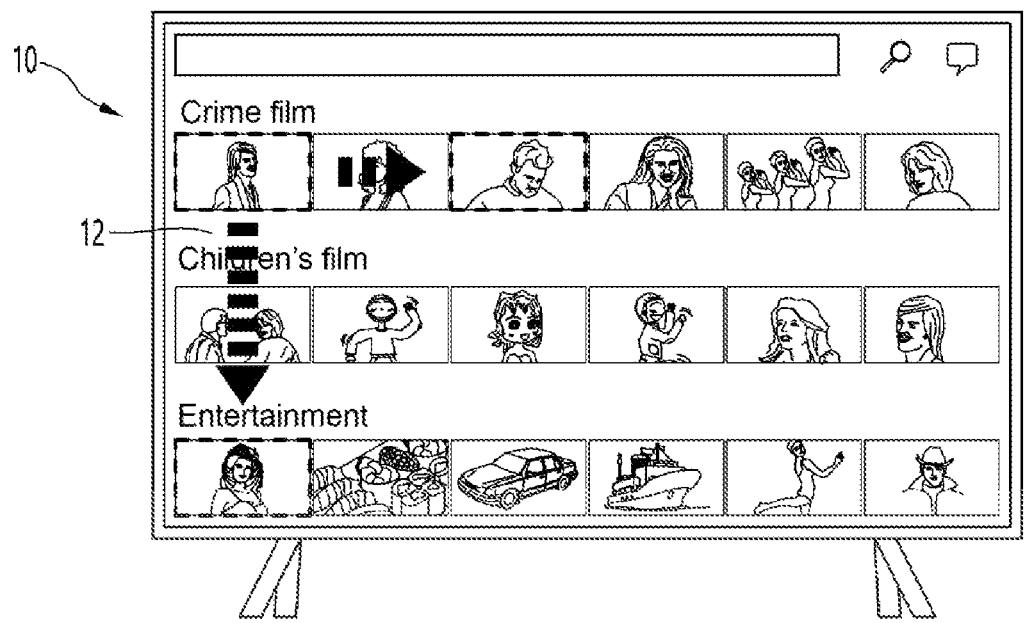
FIG. 1 is a diagram illustrating an example of a conventional media content selection control method.
Figure 1:
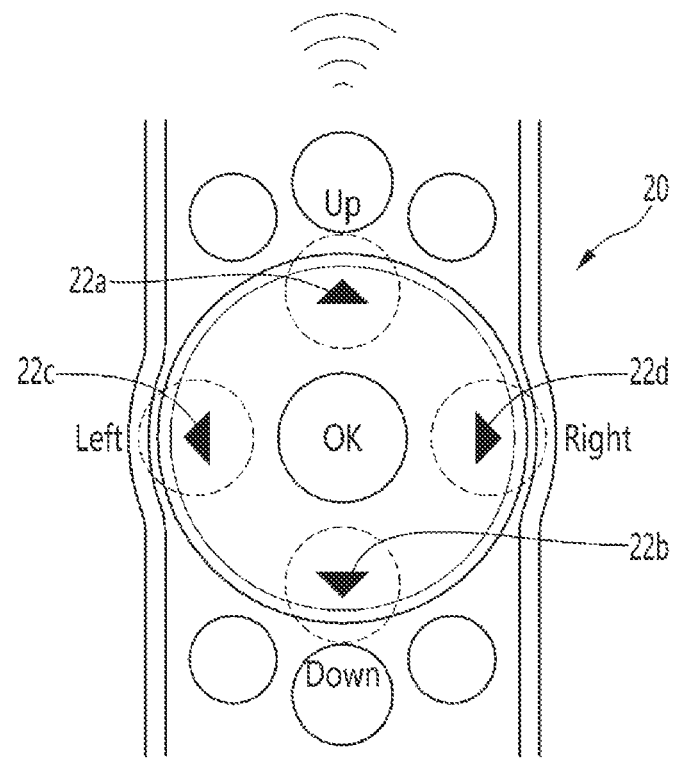

The invention may be modified in various forms and may have various embodiments. Specific embodiments will be illustrated in the drawings and described in detail.

However, the embodiments are not intended to limit the invention, but it should be understood that the invention includes all modifications, equivalents, and replacements belonging to the concept and the technical scope of the invention.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Unless otherwise defined, all technical or scientific terms used herein have the same meaning as commonly understood by those skilled in the art to which the present invention belongs. Terms that are defined in standard dictionaries and have meanings consistent with the meanings in the context of the relevant art should be interpreted in a manner consistent with the context of the relevant technology. Unless explicitly defined in this application, terms should not be interpreted in an idealized or overly formal sense.

Hereinafter, with reference to the accompanying drawings, preferred embodiments of the present invention will be described in detail. To facilitate overall understanding in describing the present invention, the same reference numerals are used for the same components in the drawings, and redundant descriptions of the same components are omitted.

Figure 3:
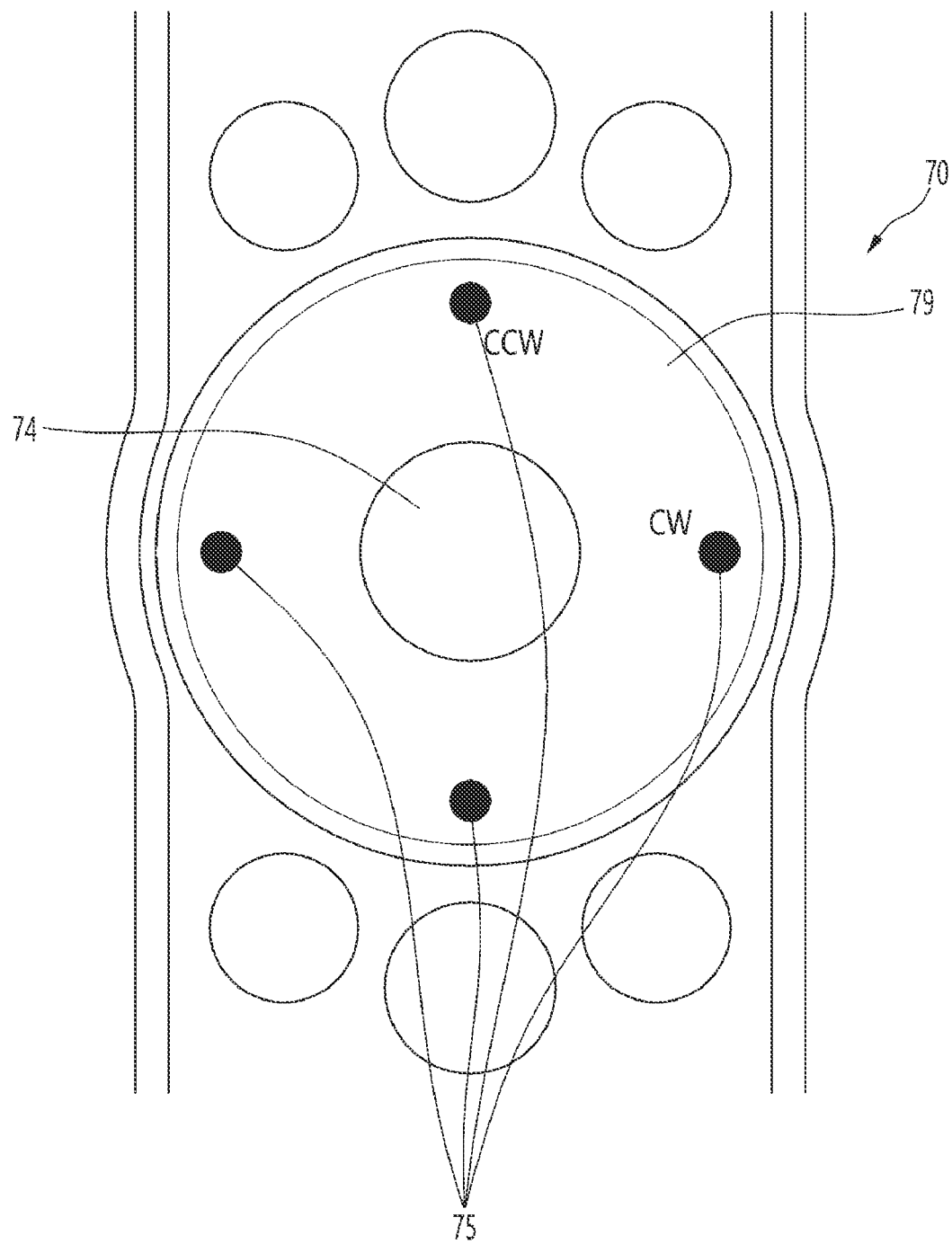
FIG. 3 is a diagram depicting the external appearance of essential parts of an input device according to an embodiment of the present invention.

FIG. 3 is a diagram depicting the external appearance of essential parts of an input device according to an embodiment of the present invention.

The input device according to an embodiment of the present invention may include various devices for transmitting input signals to a remotely controlled target device (e.g., an A/V device such as a TV set).

For instance, the input device according to an embodiment of the present invention may be a remote controller 70 as illustrated in FIG. 3.

The input device according to an embodiment of the present invention (e.g., a remote controller 70) includes an OK key 74, a navigation key 75, and a touch member 79.

The OK key 74 is installed on the top surface of the remote controller 70, and may be in the form of a push button.

The OK key 74 may be installed in the middle of the touch member 79 to be operated separately from the touch member 79. The OK key 74 may perform a vertical motion by a user's push action.

The OK key 74 may perform a confirmation function by user operation.

In FIG. 3, the navigation key 75 and the touch member 79 are formed to surround the OK key 74, but the OK key 74 operates independently from the navigation key 75 and the touch member 79.

The touch member 79 is installed in a stationary manner without rotating. The user can directly touch the touch member 79 with the finger or other means. In other words, the user can keep the finger on the touch member 79 and moves the finger in a clockwise (CW) or counterclockwise (CCW) direction on the touch member 79.

The navigation key 75 is operated when the user wants to select a direction among the four directions (e.g., up, down, left, right).

In FIG. 3, the navigation key 75 is illustrated like a protrusion, but may not be actually seen with the naked eyes since being installed underneath the touch member 79.

In other words, in FIG. 3, four points indicated by guide lines as the navigation key 75 do not represent the navigation key but rather indicate points corresponding to the four directions (e.g., up, down, left, right) selectable by the user. Therefore, when the user presses any one among the four points indicated as the navigation key 75 (i.e., when the user presses any one of the four points on the touch member 79), the dial key may operate in the direction corresponding to the direction pressed by the user among the four directions.

The input device (e.g., the remote controller 70) according to an embodiment of the present invention may communicate with an A/V device 10 or a set-top box (not shown) connected to the A/V device 10 through various communication methods (e.g., IR communication, RF wireless communication, such as Bluetooth, Zigbee, or the like).

For example, in a case in which media contents are provided from the A/V device 10, the input device according to an embodiment of the present invention, such as the remote controller 70, may control the media contents directly through IR or RF communication.

On the other hand, when connected to a set-top box and an A/V device 10, the input device (e.g., the remote controller 70) according to an embodiment of the present invention may control the media content of the set-top box (omitted in the description) directly through IR or RF communication.

The input device (e.g., the remote controller 70) according to an embodiment of the present invention has a structure capable of simultaneously performing a direction (e.g., up, down, left, right) selection function and a wheel function. That is, in the input device (e.g., the remote controller 70) according to an embodiment of the present invention, since the touch member 79 and the navigation key 75 are combined to move together, the movement in the row or column direction occurs smoothly and naturally when the user presses any one among the up, down, left, and right points. Therefore, the remote controller 70 can control fast, free, and intuitive movement to the media content arranged in the next row.

Meanwhile, conventionally, when a user wanted to find a desired video frame while watching video media, the user had to click a rewind key or a fast-forward key one by one with the finger to find the desired video frame. However, the input device (e.g., a remote controller 70) according to an embodiment of the present invention allows the user to place the finger on the touch member 79, which does not rotate, and rotate (move) the finger in the clockwise or counter-clockwise direction to quickly move the playback position of the video frame to the left or right. So, the user can find the position of a video frame that the user wants to watch more quickly and accurately. Of course, the input device (e.g., the remote controller 70) according to an embodiment of the present invention may allow the user to click the rewind key (or left key) or the fast-forward key (or right key) one by one to find the desired video frame.

In conclusion, the input device according to the exemplary embodiment of the present invention described above enables faster and more intuitive selection of desired media contents or video frames to enhance user convenience.

Figure 4:
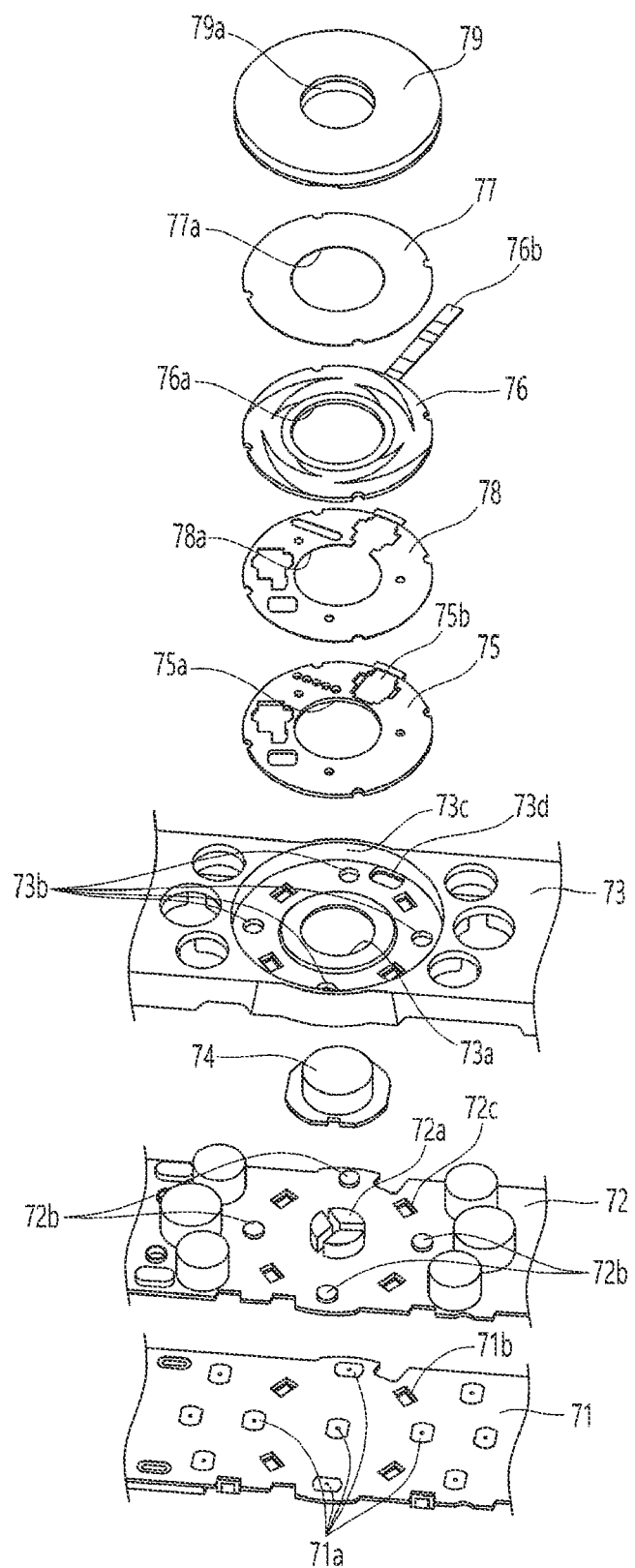
FIG. 4 is an exploded perspective view of the input device according to an embodiment of the present invention.
Figure 5:
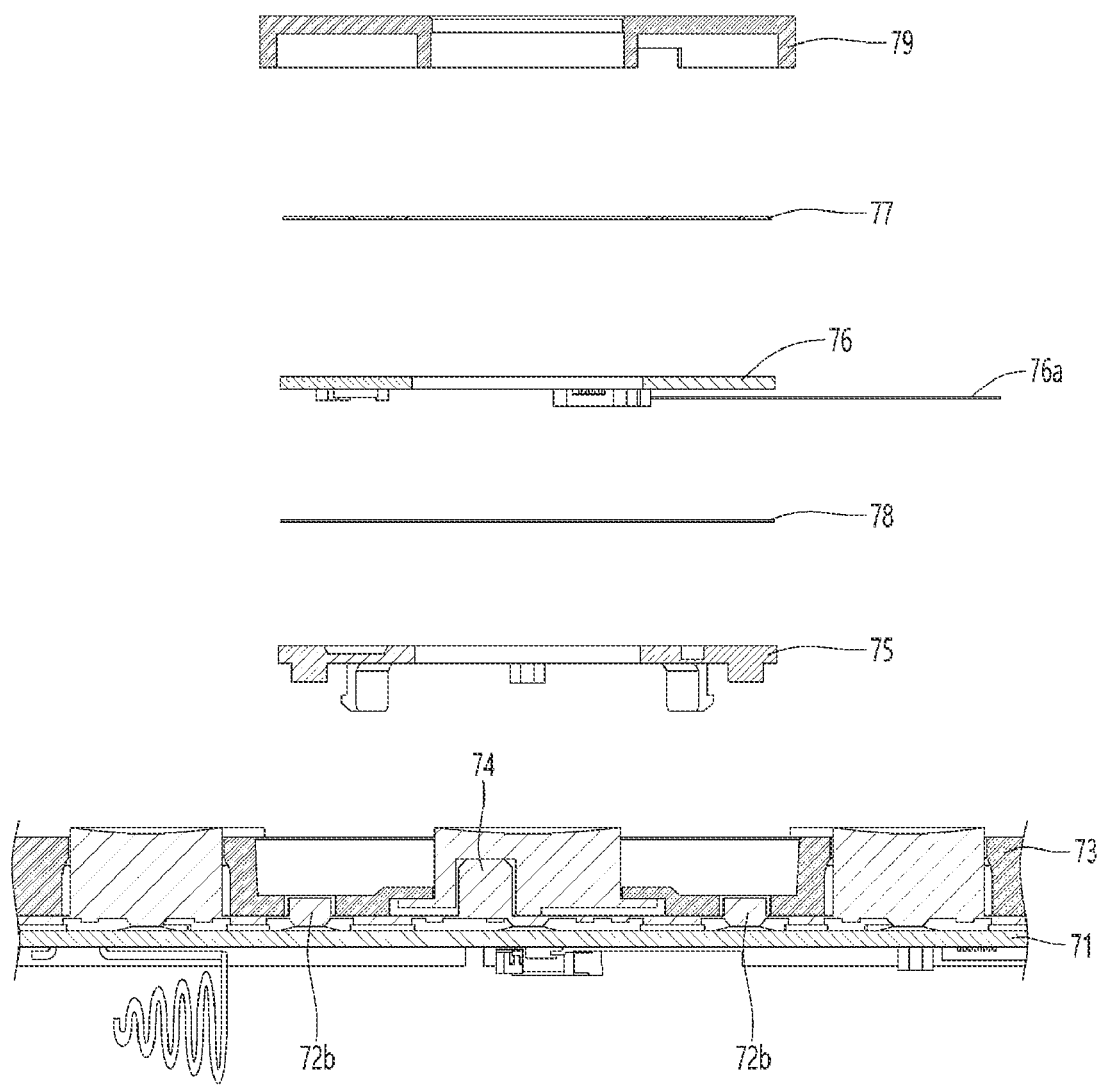
FIG. 5 is an exploded sectional view of the input device according to an embodiment of the present invention.
Figure 6:
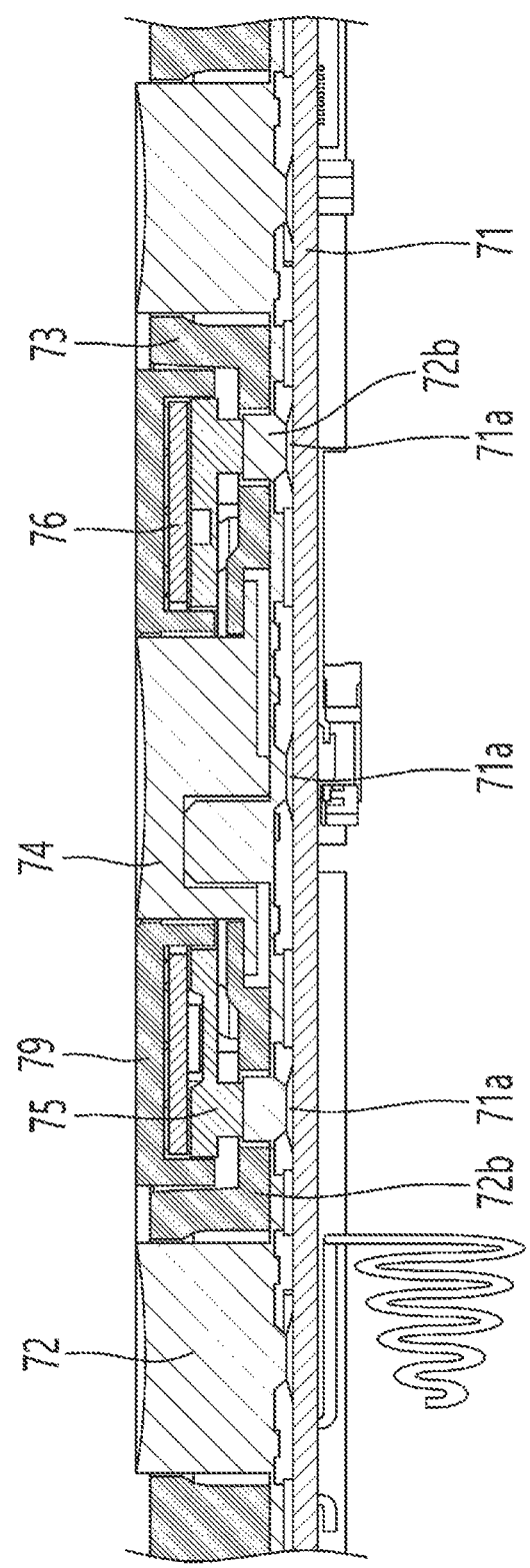
FIG. 6 is a sectional view illustrating an assembled state of the input device according to an embodiment of the present invention.
Figure 7:
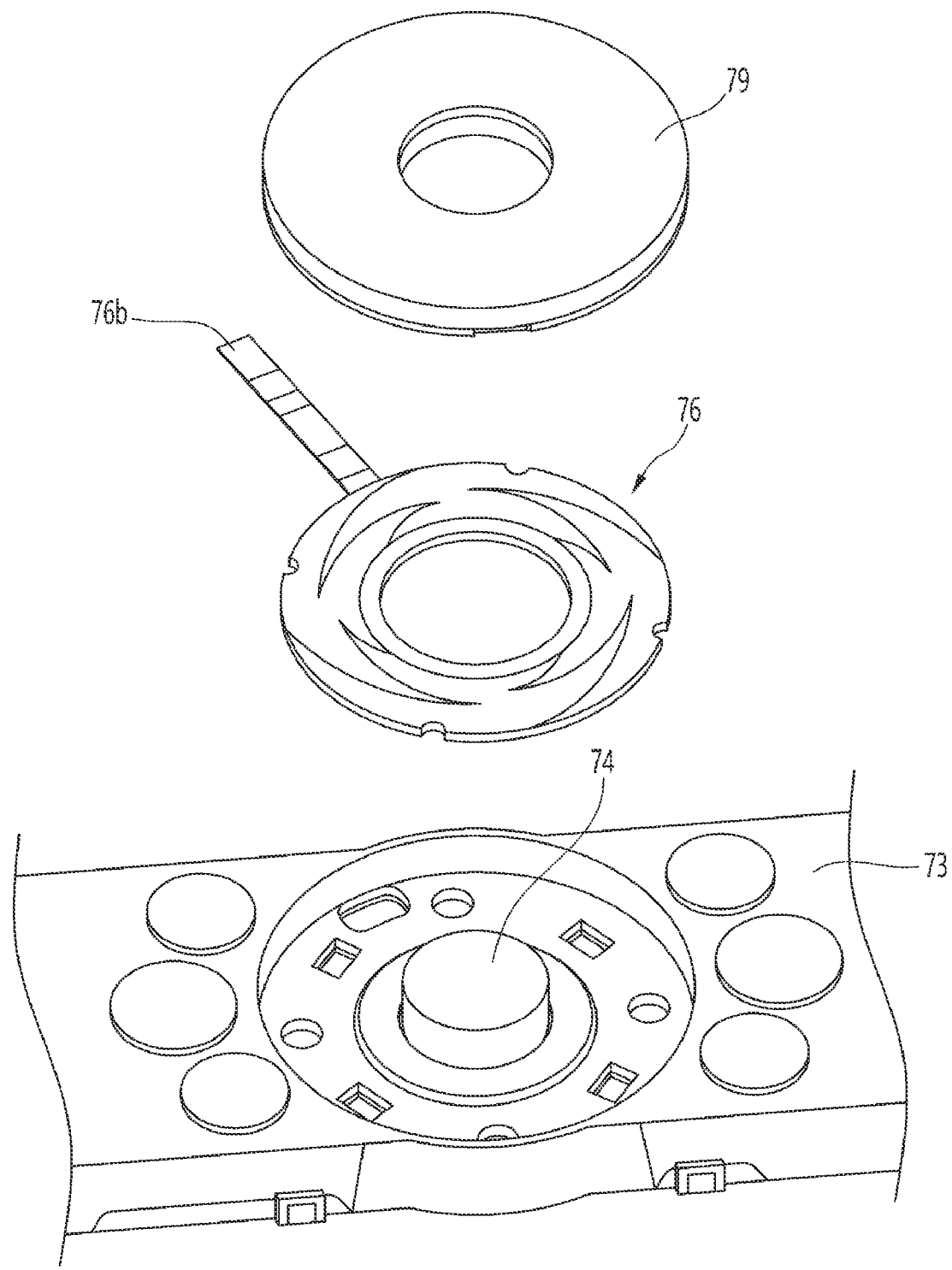
FIG. 7 is a diagram illustrating a coupling relation among a cover body, a touch PCB assembly, and a touch member according to an embodiment of the present invention.
Figure 8:
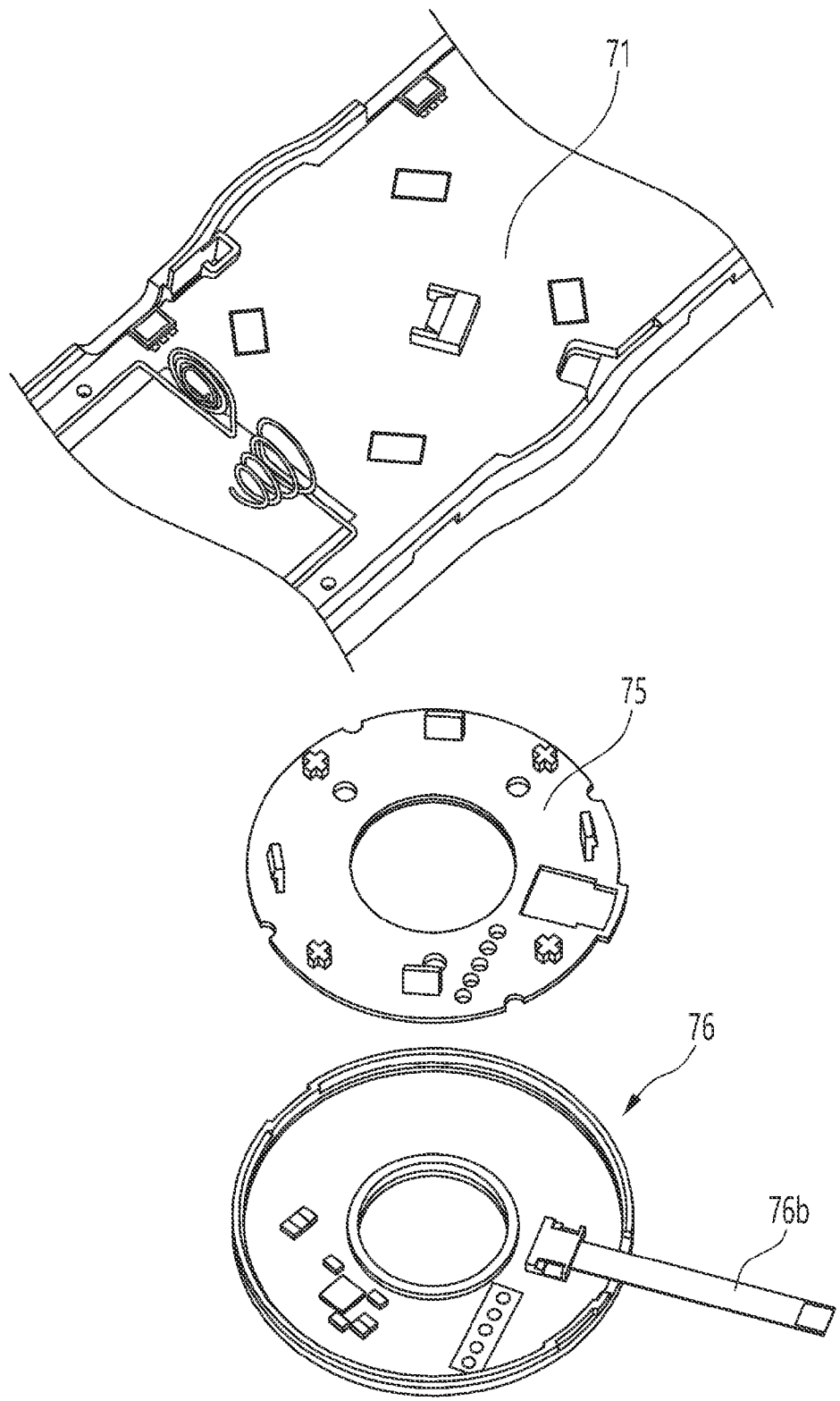
FIGS. 8 to 10 are diagrams illustrating a coupling relation among a main PCB assembly, a navigation key, and the touch PCB assembly according to an embodiment of the present invention.
Figure 9:
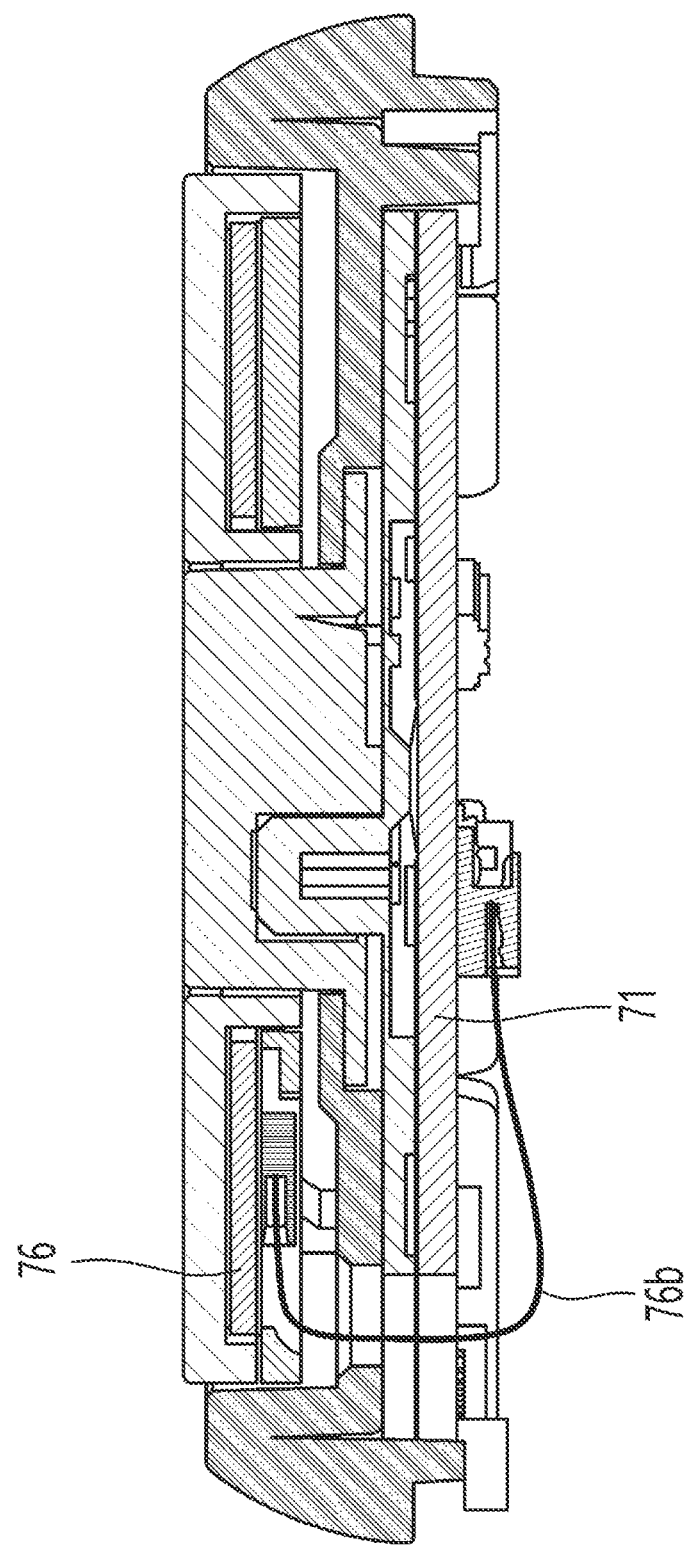
Figure 10:
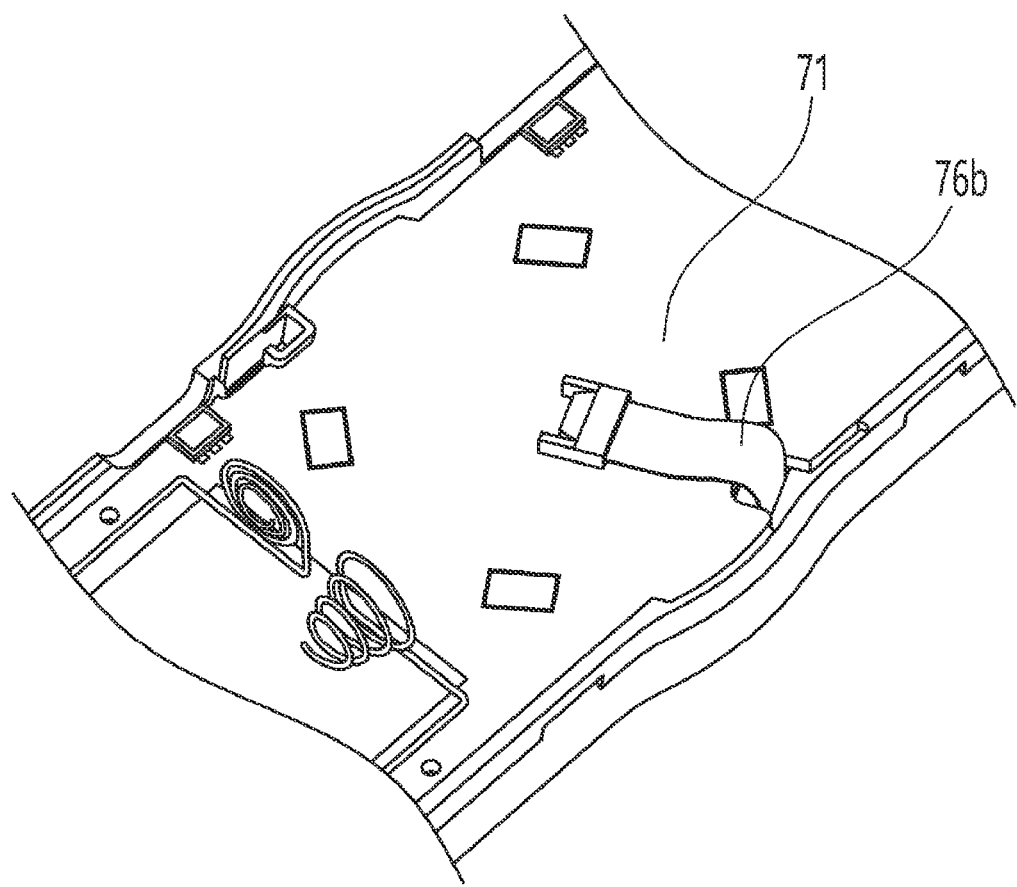
Figure 11:
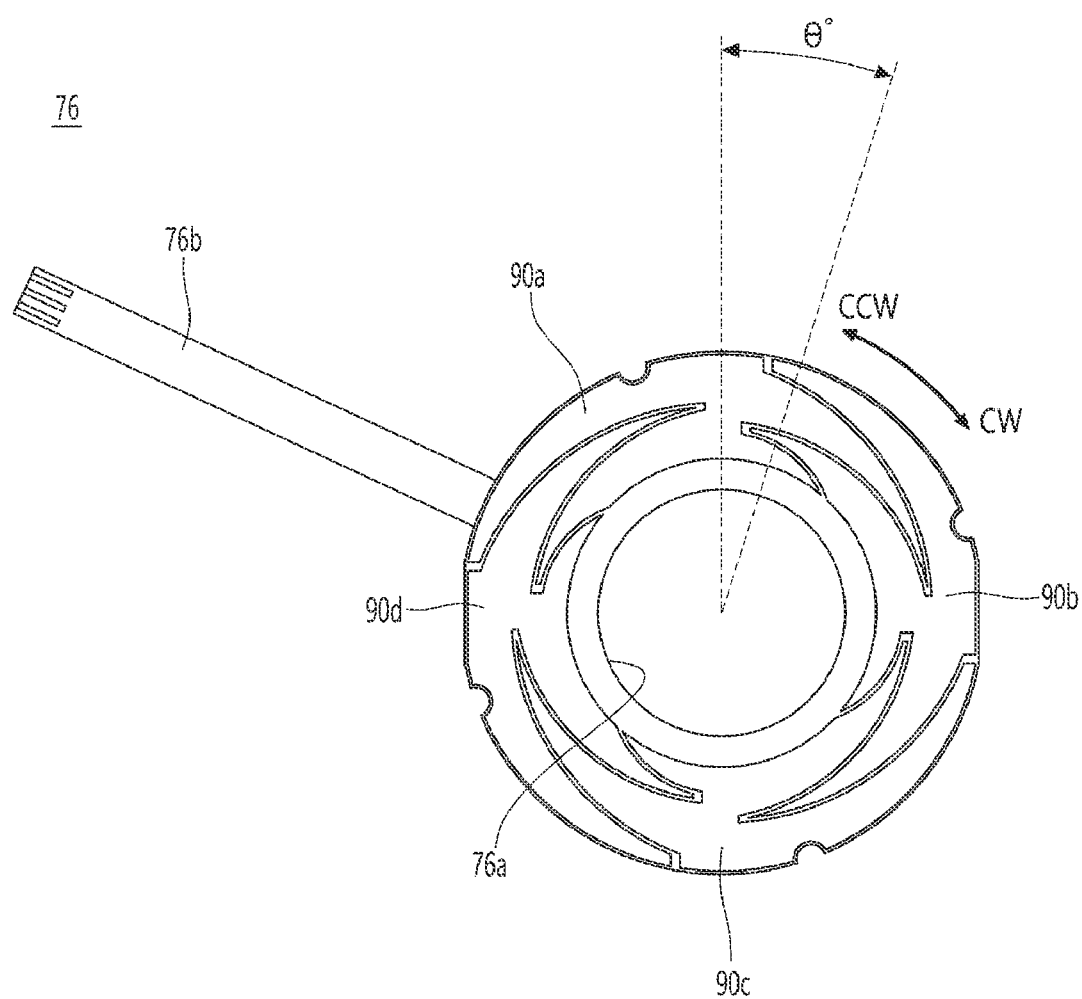
FIG. 11 is an enlarged view of the touch PCB assembly according to an embodiment of the present invention.

FIG. 4 is an exploded perspective view of the input device according to an embodiment of the present invention, FIG. 5 is an exploded sectional view of the input device according to an embodiment of the present invention, FIG. 6 is a sectional view illustrating an assembled state of the input device according to an embodiment of the present invention, FIG. 7 is a diagram illustrating a coupling relation among a cover body, a touch PCB assembly, and a touch member according to an embodiment of the present invention, FIGS. 8 to 10 are diagrams illustrating a coupling relation among a main PCB assembly, a navigation key, and the touch PCB assembly according to an embodiment of the present invention, and FIG. 11 is an enlarged view of the touch PCB assembly according to an embodiment of the present invention.

The the input device (e.g., the remote controller 70) according to an embodiment of the present invention includes a main PCB assembly 71.

A cover body 73 is positioned on one side (e.g., the top side) of the main PCB assembly 71, and a keypad 72 made of an insulating material (e.g., rubber, etc.) is interposed between the main PCB assembly 71 and the cover body 73.

A a plurality of switches 71a are installed in the middle of and around the main PC assembly 71.

A protrusion 72a is formed at the center of the keypad 72, and the OK key 74 is inserted into the protrusion 72a. Therefore, when the user presses the OK key 74, the protrusion 72a is pressed downwardly so as to be connected to a switch located at the center of the main PCB 71. Accordingly, a control unit and other units can recognize that the user presses the OK key 74.

In the meantime, a plurality of actuators 72b surrounded by an insulating material (e.g., rubber, etc.) are installed around the protrusion 72a of the keypad 72 to be spaced apart from each other. Furthermore, the protrusion 72a faces also a hole 73a of the cover body 73.

The plurality of actuators 72b are installed at positions facing the plurality of switches located around the center of the main PCB assembly 71, and each actuator 72b is installed to face and touch each switch corresponding to the actuator.

In an embodiment of the present invention, the switches around the center of the main PCB assembly 71 and the actuators 72b on the keypad 72 are set to four each. The switches and the actuators 72b which face each other can be installed at positions corresponding to left, right, up, and down points, respectively. Therefore, the switches located around the center of the main PCB assembly 71 can be referred to as switches for direction detection (or selection point detection).

In other words, the switches around the center of the main PCB assembly 71 and the actuators 72b on the keypad 72 are used to detect which point (direction) among up, down, left, and right points is selected by the operation of the navigation key 75 which will be described later.

The cover body 73 includes the navigation key 75, a touch PCB assembly 76, and the touch member 79.

A perforated circular hole 73a is formed in the center of the storage space 73c to have a diameter sufficient to expose the OK key 74, and a seating portion with a predetermined width is formed adjacent to the edge of the hole 73a.

In other words, the navigation key 75 is first placed on the seating portion of the storage space 73c, and the touch PCB assembly 76 is placed on the upper portion of the navigation key 75 as shown in FIG. 7. Finally, the touch member 79 is placed on the touch PCB assembly 76.

When the cover body 73 is positioned on one side (e.g., the top side) of the main PCB assembly 71 by the medium of the keypad 72, the actuators 72b of the keypad 72 are inserted into the actuator insertion holes 73b of the cover body 73, and a portion (e.g., the upper portion) of the exposed actuator 72b protrudes upward through the actuator insertion hole 73b. The upper portion of the exposed actuator 72b comes into contact with the bottom surface of the navigation key 75.

A circular hole 75a is formed in the center of the navigation key 75 to have a diameter sufficient to expose the upper surface of the OK key 74.

Since the touch member 79 is positioned on the upper part of the navigation key 75 by the medium of the touch PCB assembly 76, when the user presses any one among the four points (up/down/left/right) of the touch member 79, the applied force operates the corresponding actuator 72b through the corresponding point of the navigation key 75. As a result, the switch 71b facing the operated actuator 72b among the plurality of switches 71b formed on the main PCB assembly 71 is operated. The main PCB assembly 71 detects an electrical signal from the operated switch, performs electrical processing, and transmits the corresponding remote control signal (e.g., a movement signal in the left/right/up/down direction) to the target device (e.g., a video playback device of a TV, an A/V device, or the like).

Referring to FIG. 8, a groove is formed on the perimeter (border) of the navigation key 75, and a retaining jaw is formed on the perimeter (border) of the bottom surface of the touch PCB assembly 76. In other words, in the embodiment of the present invention, since the touch PCB assembly 76 is stacked on the upper portion of the navigation key 75, the retaining jaw of the bottom surface of the touch PCB assembly 76 is engaged with the groove of the perimeter (border) of the navigation key 75. Accordingly, the touch PCB assembly 76 can be securely fixed while maintaining contact with the upper surface of the navigation key 75.

The touch PCB assembly 76 may include a channel unit 90 having rotation detection channels 90a to 90d patterned thereon, and a foldable cable 76b to be connected to the main PCB assembly 71. One side of the cable 76b is connected to the channel unit 90, and the other side is connected to the main PCB assembly 71.

Here, the other side of the cable 76b can be connected to the bottom surface of the main PCB assembly 71 through a hole 78a of an adhesive member 78, a hole 75b formed in the navigation key 75, a hole 73d formed in the cover body (73), a hole 72c formed in the keypad 72, and a hole 71b formed in the main PCB assembly 71 (refer to FIGS. 9 and 10).

Referring to FIG. 11, the touch PCB assembly 76 includes the channel unit 90 and the cable 76b connected to one side of the channel unit 90. The channel unit 90 has the channels 90a to 90d that can detect touch and rotation (movement) of the user's finger.

When the user touches the finger on each channel 90a to 90d, the touch PCB assembly 76 can detect the position of each channel by sensing minute static electricity of the user's body.

Since the touch member 79 is located on the upper portion of the touch PCB assembly 76, when the user touches the finger on any surface of the touch member 79, the touch PCB assembly 76 can detect the corresponding channel position by sensing the minute static electricity of the user's body. Similarly, when the user rotates (i.e., moves) the finger in a clockwise (CW) or counterclockwise (CCW) direction while touching the surface of the touch member 79, the touch PCB assembly 76 generates a change difference in capacitance value for each channel. The touch PCB assembly 76 utilizes the change difference in the capacitance value for each channel to perceive the corresponding absolute coordinates, processes the absolute coordinates into electrical signals, and then, transmits the signals to the main PCB assembly 71 (i.e., control unit) through the cable 76b.

That is, the touch PCB assembly 76 can calculate and convert the capacitance difference values resulting from the rotation (movement) of the touched finger into angles ($\theta°$). Therefore, when the touch PCB assembly 76 performs one full revolution (360°), the channel unit 90 of the touch PCB assembly 76 can be divided into several sectors. For example, it can be divided like $\theta°=30°/12$ Sectors, $\theta°=40°/9$ Sectors, and so on. As more sectors are formed, variables that enable sensitive (quick) touch operation are generated. So, the touch PCB assembly can detect the selection and the clockwise or counterclockwise rotation (movement) of media content using the above.

The channel unit 90 is formed in a doughnut shape, as shown in FIG. 11, and a hole 76a formed in the center of the channel unit 90 has a diameter sufficient to allow the upper portion of the OK key 74 to pass through.

Furthermore, an adhesive member 77 like an adhesive tape may be adhered on the upper surface of the channel unit 90 of the touch PCB assembly 76, and the adhesive member 78 like an adhesive tape may be adhered on the bottom surface of the channel unit 90 of the touch PCB assembly 76.

Additionally, holes 77a and 78a having a diameter sufficient to allow the upper portion of the OK key 74 to pass through are formed in the center of each of the adhesive members 77 and 78.

A circular hole 79a having a diameter sufficient to allow the upper portion of the OK key 74 to pass through and to be exposed is formed in the center of the touch member 79.

As described above, since the touch member 79 is located on the upper portions of the touch PCB assembly 76 and the navigation key 75, the touch PCB assembly 76 and the navigation key 75 are not visible to the user's naked eye. Therefore, the user can touch the touch member 79 with the finger to rotate it in one direction or select (click) any one among the four points (up/down/left/right).

Furthermore, the OK key 74 can operate independently of the touch member 79. In other words, when the user presses the OK key 74, the protrusion 72a of the keypad 72 moves downward independently, thereby pressing the switch 71a located at the center of the main PCB assembly 71. Then, the main PCB assembly 71 generates the corresponding remote control signal and transmits it to the target device (e.g., the video playback device of the TV, A/V device, or the like).

The exemplary embodiment of the present invention, as described above, may have a stacked structure in order to prevent an increase in the thickness of the input device (e.g., remote controller 70) due to the thickness of each module (component). That is, the storage space 73c is formed in the cover body 73, and then, modules (components) such as the navigation key 75, the touch PCB assembly 76, the adhesive members 77 and 78, and the touch member 79 are stacked sequentially in the storage space 73c, such that the module thickness of each component may be absorbed to some extent. Therefore, an increase in the thickness of the input device (e.g., a remote controller 70) can be prevented.

Meanwhile, as described above, the touch PCB assembly 76 is connected to the main PCB assembly 71 through the cable 76b, and the touch member 79 is positioned on the upper portion of the touch PCB assembly 76. Therefore, when the user touches the upper surface of the touch member 79 and moves it, the corresponding rotational direction (movement direction) and rotational speed (movement speed) can be detected. In other words, when the user touches the upper surface of the touch member 79, the touch PCB assembly 76 can detect the corresponding channel position by sensing minute static electricity of the user's body. In this state, when the user rotates (moves) the finger in the clockwise (CW) or counterclockwise (CCW) direction while touching the upper surface of the touch member 79, the touch PCB assembly 76 generates change differences in capacitance value for each channel. The touch PCB assembly 76 perceives it as the absolute coordinates, processes the coordinates into electrical signals, and transmits the signals to the main PCB assembly 71 through the cable 76b. In other words, the touch PCB assembly 76 can transmit electrical signals corresponding to the rotational direction and speed when the user rotates the finger on the touch member 79 to the main PCB assembly 71. Accordingly, the main PCB assembly 71 detects the electrical signals corresponding to the rotational direction (movement direction) and rotational speed (movement speed), performs electrical processing, and transmits remote control signals.

Figure 2:
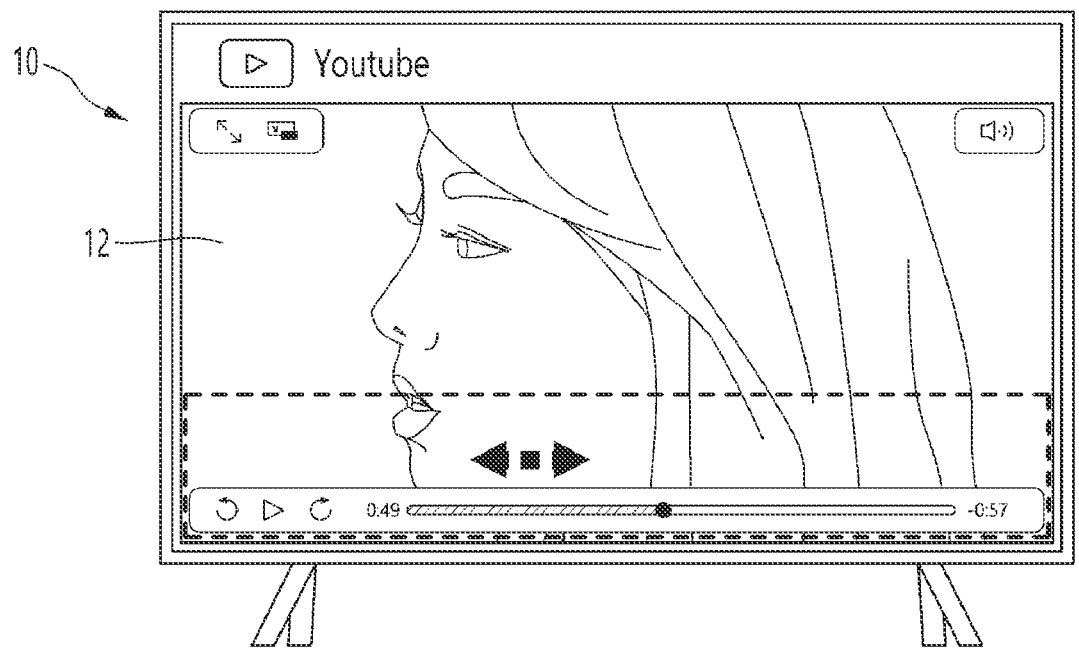
FIG. 2 is a diagram illustrating an example of a conventional video media frame selection control method.
Figure 2:
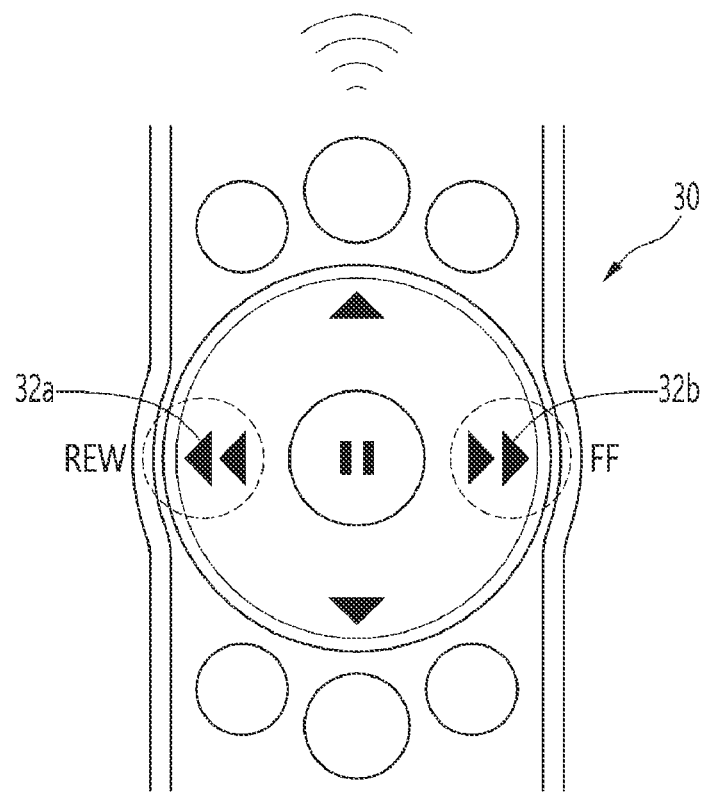

Of course, the main PCB assembly 71 will transmit remote control signals in an input cycle corresponding to the rotational speed. In this case, the remote control signal may be a signal that enables faster scrolling to the desired media content among the media contents aligned in one row, as compared to FIG. 1, or a signal that allows faster movement of the desired video frame as compared to FIG. 2.

That is, in the conventional IR communication, it is difficult to operate at speed faster than 108 milliseconds (approximately nine times per one second) no matter how quickly the user operates (presses) the Left/Right keys.

However, according to the described embodiment of the present invention, when the user rotates (i.e., moves) the finger while touching the touch member 79, it is possible to transmit operation signals (i.e., remote control signals) at a faster speed than in the conventional IR communication and RF communication.

In other words, when the user moves the finger on the touch member 79 in one direction while touching it, it is possible to scroll to the desired media content among the media contents aligned in one row on the user interface screen (12) faster than the conventional method, or to move the playback position of the video frame faster than the conventional method.

Therefore, the selection of media contents by a media consumer can be controlled faster and more intuitively.

Figure 12:
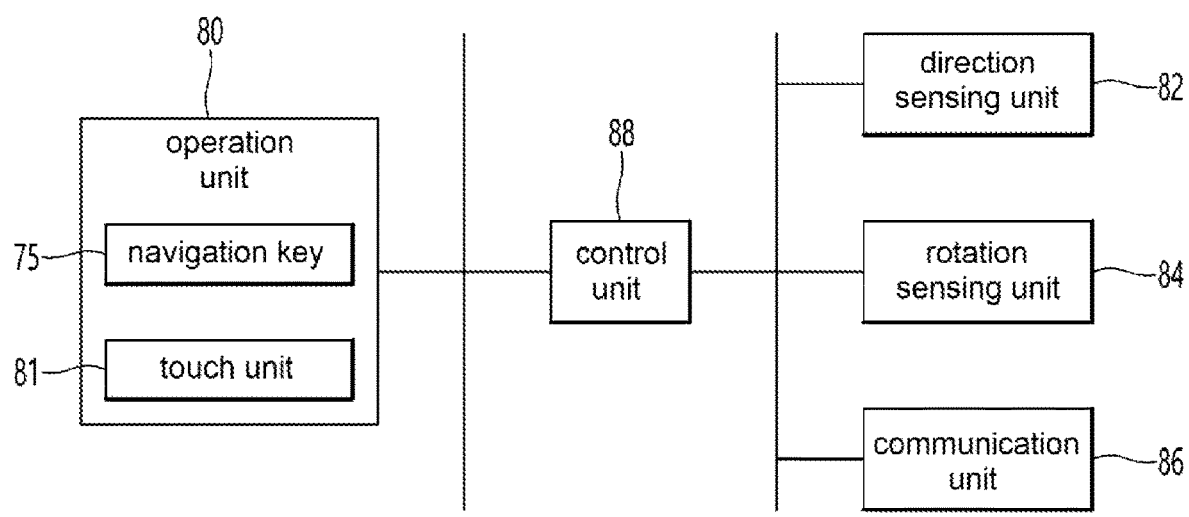
FIG. 12 is a block diagram of the input device according to an embodiment of the present invention.

The input device according to an embodiment of the present invention may be software-expressed and may include components as illustrated in FIG. 12.

In FIG. 12, the input device (e.g., remote controller) according to an embodiment of the present invention may include an operation unit 80, a direction sensing unit 82, a rotation sensing unit 84, a communication unit 86, and a control unit 88.

The operation unit 80 includes the navigation key 75 and the touch unit 81, and may take charge of direction selection and rotation of the touch member 79.

In other words, the operation unit 80 may perform a key input to quickly move media contents aligned in one row of the user interface screen to the left or right, to move to media contents placed in the upper or lower rows, or to quickly move the playback position of video frames.

As described above, the navigation key 75 is operated when selecting any direction among the four directions (e.g., points).

As described above, the navigation key 75 is stored in the storage space 73c of the cover body 73, and comes into contact with the actuator 72b.

The touch unit 81 is manipulated when the user tries to rotate while touching a portion of the user's body (e.g., finger) on the touch unit 81.

The touch unit 81 may include the touch PCB assembly 76 and the touch member 79. As described above, the touch PCB assembly 76 and the touch member 79 are connected to each other in a stacked structure together with the navigation key 75.

The touch PCB assembly 76 and the touch member 79 can be assembled in the stacked structure, and after assembly, only the topmost touch member 79 is visually apparent. Therefore, from an external perspective, only the touch member 79 will appear to be touched. Additionally, from an external perspective, it is not possible to directly manipulate the navigation key 75, but it is possible to select a desired point (direction) among left, right, up, and down points by pressing the position (direction) representing any one among the four points (directions) on the touch member 79.

Meanwhile, the operation unit 80 may include the OK key 74 in addition to the navigation key 75 and the touch unit 81.

The direction sensing unit 82 may detect which direction (e.g., point) is selected (clicked) as the navigation key 75 is operated.

Actually, although the navigation key 75 is positioned below the touch member 79 and cannot be visually observed, the direction sensing unit 82 may detect which direction (e.g., up, down, left, right) corresponds to the area pressed on the touch member 79.

For example, the direction sensing unit 82 may include the actuator 72b and the switch 71b.

The rotation detection unit 84 can detect the rotational direction (movement direction) and rotational speed (movement speed) of a portion of the user's body (e.g., finger) that moves while touching the touch module 81. For example, when the user rotates (moves) the finger in the clockwise (CW) or counterclockwise (CCW) direction while touching the surface of the touch member 79 of the touch module 81, the touch PCB assembly 76 generates a change difference in capacitance values for each channel. The touch PCB assembly 76 recognizes the corresponding absolute coordinates using the change difference in capacitance values, processes them into electrical signals, and transmits the signals to the control unit 88 (including the main PCB assembly 71) via the cable 76b. The control unit 88 receives data from the touch PCB assembly 76 and transmits the data to the rotation detection unit 84 to command to perform rotation detection operation. Accordingly, the rotation detection unit 84 can detect the rotational direction (movement direction) and rotational speed (movement speed) of a portion of the user's body (e.g., finger) based on the data received from the touch PCB assembly 76.

In FIG. 12, the direction sensing unit 82 and the rotation sensing unit 84 are illustrated as separate units for convenience. However, if necessary, they may be considered as a single unit capable of detecting both direction and rotation (referred to as a direction and rotation sensing unit). Therefore, the direction and rotation sensing unit may detect one or more among the direction selected by the navigation key 75 and the rotational direction and rotational speed by the touch unit 81.

The communication unit 86 may transmit the remote control signal generated from the control unit 88 to the target device (e.g., the video playback device of the TV, or the like) based on the detection signals from the direction sensing unit 82 and rotation sensing unit 84. In this instance, the communication unit 86 may transmit the remote control signal using RF communication or IR communication.

The control unit 88 controls the overall operation of the input device (e.g., remote controller) according to an embodiment of the present invention.

Based on the detection signals from the direction sensing unit 82 and rotation sensing unit 84, the control unit 88 generates the remote control signal and transmits it to the communication unit 86. Accordingly, the communication unit 86 may transmit the remote control signal to the target device (e.g., the video playback device of the TV, the A/V device, or the like).

Therefore, the control unit 88 controls the movement on the user interface screen of the target device based on at least one of the direction input corresponding to the navigation key 75 and the rotation input from the touch unit 81.

For example, the control unit 88 may control the selection movement between media contents aligned in rows or columns on the user interface screen on video media of the target device based on at least one of the direction input corresponding to the navigation key 75 and the rotation input from the touch unit 81.

Moreover, the control unit 88 may scroll the media contents, which are aligned in rows or columns on the user interface screen, in the rotational direction of the touch unit 81 by sending a remote control signal to the video medium in the input cycle corresponding to the rotational speed of the touch unit 81. In this instance, the scroll speed may be determined by the input cycle corresponding to the movement speed (namely, rotational speed) by a portion of the user's body on the touch unit 81.

Furthermore, the control unit 88 may move the playback position of video frames at a speed determined by the input cycle with respect to the movement speed (namely, rotational speed) by a portion of the user's body on the touch unit 81 by sending a remote control signal to the video medium in the input cycle corresponding to the movement speed (namely, rotational speed) by a portion of the user's body on the touch unit 81.

Moreover, the control unit 88 may also control the row movement or the column movement of the media contents in the matrix structure on the user interface screen based solely on the direction selected by the navigation key 75, independently from the rotation input on the touch unit 81.

To perform these operations, the control unit 88 may include the main PCB assembly 71.

Now, the control unit 88 will be described in detail.

The control unit 88 may generate a remote control signal in the input cycle corresponding to the rotation detection speed in the rotation (movement) of the user's finger on the touch unit 81 and transmit it to the target device. Accordingly, if the user rapidly moves (rotates) the finger on the touch unit 81, the media contents aligned in one row on the user interface screen 12 of the target device may be scrolled quickly in the corresponding direction, or the playback position of the video frame of a single media content displayed on the user interface screen 12 may be moved rapidly in the corresponding direction by the rapid input cycle.

That is, the control unit 88 may control the movement of media contents aligned in rows on the user interface screen and the movement of the playback position of the video frame based on the operation (touch and movement) on the touch unit 81. Accordingly, the control unit 88 may move the media contents aligned in the row on the user interface screen in the rotational direction of the touch member 40 by sending a remote control signal to the target device having the input cycle of the speed corresponding to the movement speed (rotational speed) of the user's finger on the touch unit 81.

Meanwhile, the control unit 88 may move the playback position of the video frame in the movement direction (rotational direction) of the finger on the touch unit 81 by sending a remote control signal to the target device having the input cycle of the speed corresponding to the movement speed (rotational speed) of the user's finger on the touch unit 81.

Furthermore, when the navigation key 75 is operated for row movement of the media contents in the matrix structure displayed on the user interface screen 12 (i.e., when the position corresponding to the up or down direction on the touch member 79 is pressed), the control unit 88 may generate a remote control signal based on the direction detection of the direction sensing unit 82 according to the operation of the navigation key 75, and transmit the signal to the target device. As a result, the row movement of the media contents of the matrix structure displayed on the user interface screen 12 of the target device is performed. In contrast, when the position corresponding to the left or right direction on the touch member 79 is pressed, the control unit 88 performs control in the usual manner.

In other words, based solely on the direction selected by input of the navigation key 75, the control unit 88 may control the column movement or the row movement of the media contents of the matrix structure on the user interface screen can be controlled.

Of course, if necessary, the direction sensing unit 82 and the rotation sensing unit 84 may be included in the control unit 88. In this case, the control unit 88 may detect the direction and/or rotation based on a manipulation signal of the operation unit 80, and then, transmit a remote control signal corresponding to the sensed result to the control target device.

As described above, the best embodiments have been disclosed in the drawings and specification. Specific terms have been used for the purpose of describing the present invention, but they were used merely for the purpose of describing the invention and not to limit the scope of the invention as defined in the claims. Therefore, those skilled in the art will understand that various modifications and equivalent embodiments are possible based on common knowledge in the technical field. Thus, the true scope of protection of the present invention should be determined by the technical idea of the appended claims.

The invention claimed is:

1. An input device comprising:
  a navigation key manipulated to select one direction among a plurality of directions;
  a touch unit which is manipulated by a user to input rotation while the user touches the touch unit with a portion of the user's body; and
  a control unit which controls movement on a user interface screen of a target device based on one or more direction inputs corresponding to the navigation key and a rotation input on the touch unit,
  wherein the navigation key and the touch unit are coupled with each other in a stacked structure, and
  a row movement or a column movement of media contents in a matrix structure on the user interface screen is controlled based on the direction selected by the navigation key, independently from the rotation input of the touch unit.

2. The input device according to claim 1, wherein the control unit controls selection movement between the media contents aligned in rows or columns on the user interface screen based on at least one among one or more direction inputs corresponding to the navigation key and the rotation input on the touch unit.

3. The input device according to claim 2, wherein the control unit transmits remote control signals to the target device in an input cycle corresponding to the rotational speed on the touch unit, and scrolls the media contents aligned in rows or columns on the user interface screen at a speed corresponding to the input cycle with respect to the rotational direction on the touch unit.

4. The input device according to claim 2, wherein the control unit transmits remote control signals to the target device in an input cycle corresponding to the rotational speed on the touch unit, and moves a playback position of a video frame at a speed corresponding to the input cycle with respect to the rotational direction on the touch unit.

5. The input device according to claim 1, wherein the touch unit comprises:
   a touch PCB assembly which includes a plurality of channels patterned thereon to detect touch and rotation of a portion of the user's body; and
   a touch member stacked on an upper portion of the touch PCB assembly.

6. The input device according to claim 5, wherein the touch PCB assembly generates a change difference in capacitance value for each channel, processes the change difference into absolute coordinates using the change difference in capacitance value for each channel, and transmits the absolute coordinates as electrical signals to the control unit, when the user rotates (moves) the finger in a clockwise or counterclockwise direction while touching the surface of the touch member.

7. The input device according to claim 5, wherein the touch PCB assembly comprises:
   a channel unit on which the plurality of channels for rotation detection are patterned; and
   a cable of which one side is connected to the channel unit and the other side is connected to the control unit.

8. The input device according to claim 7, wherein a first adhesive member which is adhered on the upper portion of the channel unit is additionally installed between the channel unit and the touch member.

9. The input device according to claim 7, wherein the navigation key is stacked beneath the channel unit, and
   wherein a second adhesive member which is adhered on a lower portion of the channel unit is additionally installed between the channel unit and the navigation key.

10. The input device according to claim 5, wherein the touch PCB assembly is stored in a storage space of a cover body by a medium of the navigation key, and
    wherein the touch member is stored in the storage space on the upper portion of the touch PCB assembly.

11. The input device according to claim 10, wherein holes are respectively formed in centers of the cover body, the touch PCB assembly, the navigation key, and the touch member,
    wherein a key pad having a protrusion at the center is installed on a lower portion of the cover body, and
    wherein an OK key is coupled to the protrusion to pass through and to be exposed through the holes of the cover body, the touch PCB assembly, the navigation key, and the touch member.

12. An input device comprising:
    a navigation key manipulated to select one direction among a plurality of directions; and
    a touch unit which is manipulated by a user to input rotation while the user touches the touch unit with a portion of the user's body,
    wherein the touch unit comprises:
    a touch PCB assembly which includes a plurality of channels patterned thereon to detect touch and rotation of a portion of the user's body; and
    a touch member stacked on an upper portion of the touch PCB assembly, wherein the touch PCB assembly is stored in a storage space of a covered body by a medium of the navigation key, and wherein the touch member is stored in the storage space on the upper portion of the touch PCB assembly.

13. The input device according to claim 12, wherein holes are respectively formed in centers of the cover body, the touch PCB assembly, the navigation key, and the touch member,
    wherein a key pad having a protrusion at the center is installed on a lower portion of the cover body, and
    wherein an OK key is coupled to the protrusion to pass through and to be exposed through the holes of the cover body, the touch PCB assembly, the navigation key, and the touch member.

14. The input device according to claim 12, wherein the touch PCB assembly comprises:
    a channel unit on which the plurality of channels for rotation detection are patterned; and
    a cable of which one side is connected to the channel unit.

15. The input device according to claim 14, wherein a first adhesive member which is adhered on the upper portion of the channel unit is additionally installed between the channel unit and the touch member.

16. The input device according to claim 14, wherein the navigation key is stacked beneath the channel unit, and
    wherein a second adhesive member which is adhered on a lower portion of the channel unit is additionally installed between the channel unit and the navigation key.

* * * * *